United States Patent
Kittel

(10) Patent No.: US 11,975,596 B2
(45) Date of Patent: May 7, 2024

(54) PANE ARRANGEMENT AND VEHICLE

(71) Applicant: AUDI AG, Ingolstadt (DE)

(72) Inventor: Steffen Kittel, Bad Schussenried (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/066,641

(22) Filed: Dec. 15, 2022

(65) Prior Publication Data

US 2023/0182553 A1     Jun. 15, 2023

(30) Foreign Application Priority Data

Dec. 15, 2021    (DE) .................... 10 2021 133 163.3

(51) Int. Cl.
| | |
|---|---|
| *E05F 11/38* | (2006.01) |
| *B60J 10/30* | (2016.01) |
| *B60J 10/40* | (2016.01) |
| *B60J 10/75* | (2016.01) |

(52) U.S. Cl.
CPC .............. *B60J 10/75* (2016.02); *B60J 10/30* (2016.02); *B60J 10/40* (2016.02)

(58) Field of Classification Search
CPC ..... B60J 10/75; B60J 10/30; B60J 1/17; B60J 10/40
USPC ........................................... 49/374, 375, 377
See application file for complete search history.

(56) References Cited

U.S. PATENT DOCUMENTS

| | | | | |
|---|---|---|---|---|
| 3,849,827 A | * | 11/1974 | Coropolis ................ | B60J 10/74 15/250.19 |
| 3,871,049 A | * | 3/1975 | Workman ............... | B60S 1/583 15/250.19 |
| 4,761,917 A | * | 8/1988 | Knecht ................. | E06B 7/2318 49/490.1 |
| 4,976,067 A | * | 12/1990 | Maass ...................... | B60J 10/75 49/377 |
| 5,085,005 A | * | 2/1992 | Yasukawa .............. | B60J 10/265 15/250.1 |
| 5,253,453 A | * | 10/1993 | Maass .................... | B60J 10/244 15/250.1 |
| 5,339,488 A | * | 8/1994 | Maass .................... | B60J 10/248 15/250.19 |
| 5,367,831 A | * | 11/1994 | Gunkel .................... | B60J 10/84 49/478.1 |
| 5,489,104 A | * | 2/1996 | Wolff ....................... | B60J 10/77 277/648 |

(Continued)

FOREIGN PATENT DOCUMENTS

| | | |
|---|---|---|
| DE | 4119704 A1 | 12/1992 |
| DE | 19728563 A1 | 2/1999 |

(Continued)

*Primary Examiner* — Jerry E Redman
(74) *Attorney, Agent, or Firm* — Sterne, Kessler, Goldstein & Fox P.L.L.C.

(57) ABSTRACT

A pane arrangement includes a movable pane having a disinfecting inner coating, a drive that moves the pane between an open position and a closed position, and a sealing arrangement with a seal that seals the pane against a panel of a vehicle door. The pane arrangement further includes a coupling device that sealingly couples the seal against an uncoated region of the pane when the pane is set in the open position and that lifts the seal off the pane when the pane moves between the open position and the closed position.

16 Claims, 1 Drawing Sheet

(56) References Cited

U.S. PATENT DOCUMENTS

| | | | | |
|---|---|---|---|---|
| 5,870,860 | A * | 2/1999 | Heller | B60S 1/0411 49/377 |
| 6,702,301 | B1 * | 3/2004 | Davies | E06B 7/18 277/630 |
| 7,313,888 | B2 | 1/2008 | Ku | |
| 7,845,707 | B2 * | 12/2010 | Huang | B60J 10/80 277/645 |
| 7,941,890 | B1 * | 5/2011 | Alexander | B60S 1/48 15/250.1 |
| 9,669,806 | B2 * | 6/2017 | Phillip | B60J 10/75 |
| 2023/0182553 | A1 * | 6/2023 | Kittel | B60J 10/40 49/475.1 |

FOREIGN PATENT DOCUMENTS

| | | |
|---|---|---|
| DE | 102004063297 A1 | 12/2005 |
| DE | 102015007449 A1 | 8/2016 |
| DE | 102020101800 A1 | 7/2021 |
| JP | S 61178219 A | 8/1986 |

* cited by examiner

PANE ARRANGEMENT AND VEHICLE

TECHNICAL FIELD

The invention relates to a pane arrangement with a movable pane and a vehicle having at least one such pane arrangement.

BACKGROUND

Pane arrangements with a movable pane for vehicles are known in numerous variations. Typically, the movable panes are each arranged in a receiving shaft of a vehicle door.

From DE 10 2020 101 800 A1, a passenger car with a UV-C light source is known. For the purpose of improved cleaning or disinfection of a vehicle interior of a passenger car, with at least one UV-C light source arranged in a roof region of the vehicle interior, it is provided that the UV-C light source is arranged movably in the roof region and/or is arranged on a stationarily movable receptacle located in the roof region.

In addition, it is known to clean or disinfect the interior air by means of a special pane coating. By coating the inner sides of the vehicle glazing, for example with titanium oxide-based compounds, a higher degree of purity can be achieved both from biological pathogens, such as viruses and bacteria, and from fine dust and other components. However, the titanium oxide coating is not selective and does not only decompose the undesired substances, but also, for example, sealing rubbers. This does not represent a problem on the stationary panes, such as a windshield or rear window, since these are not moved and a decomposition of the seals can be prevented by the omission of the corresponding pane regions. However, in the case of movable panes this is not possible, since they are not always completely opened or completely closed. If the movable pane is, for example, only half open, the sealing rubber rests flat on the coated region of the movable pane and is affected.

SUMMARY OF INVENTION

The objective of the invention is providing a pane arrangement having a movable pane and a vehicle having such a pane arrangement which prevents a seal from resting on a region of the movable pane coated with a disinfectant inner coating.

This objective is achieved by a pane arrangement having the features of the claimed embodiments and by a vehicle having the features of the claimed embodiments. Advantageous embodiments of the invention having additional developments are specified in the dependent claims.

In order to provide a pane arrangement having a movable pane, which prevents a seal from resting on a region of the movable pane coated with a disinfecting inner coating, a coupling device is designed to sealingly couple at least one seal against an uncoated region of the pane when set in the open position and in the closed position and to lift the at least one seal off from the pane when the pane is moving and when the pane is set at positions located between an open position and a closed position.

In addition, a vehicle having at least one such pane arrangement is proposed. In this case, the at least one pane arrangement is arranged in a receiving shaft of a vehicle door.

The pane arrangement having a movable pane is hereinafter understood to mean an arrangement, the movable pane of which has a disinfecting inner coating. In addition, such a pane arrangement comprises a drive which moves the pane between the open position and the closed position, and a sealing arrangement which comprises the at least one seal for sealing the pane.

Titanium oxide-based compounds can preferably be used as disinfecting inner coating of the panes in a vehicle. Of course, other suitable materials can also be used to achieve a higher degree of purity in the interior both from biological pathogens, such as viruses and bacteria, and from fine dust and other components.

Due to the additional inner coating of the movable panes in a vehicle having a disinfecting compound, the effective disinfection surface for cleaning the interior air can be easily increased. By means of the coupling device, the at least one seal of the movable pane may be lifted off the surface of the pane when the pane is partially opened, so that there is no longer any contact when the seal is arranged above the inner coating of the pane. If the pane is completely opened or closed, the at least one seal is again in contact with the surface of the pane, which has no disinfecting inner coating in the edge regions.

In an advantageous embodiment of the pane arrangement, the coupling device may comprise a stationary lifting guide, which is oriented parallel to the direction of movement of the pane, and a movably mounted pull rod, which in the unloaded state is aligned parallel to the lifting guide and is coupled to the lifting guide via a movable coupling element. This enables a particularly simple and cost-effective implementation of the coupling device.

In a further advantageous embodiment of the pane arrangement, the pull rod can be mounted on one end in a rotatably movable manner at a fastening point and have an offset free end which is coupled to the at least one seal. The offset free end of the pull rod can preferably be coupled to the at least one seal via a spring element. The spring element causes the at least one seal to be pressed against the surface of the pane with a constant force in the closed position and in the open position of the pane.

In a further advantageous embodiment of the pane arrangement, the stationary lifting guide can form a guide track for the movable coupling element, which guide track has a recess for the movable coupling element in the direction of the pane at a first end position and at a second end position. In this case, when the coupling element enters one of the recesses, it can cause a pulling force that tilts the offset free end of the pull rod in the direction of the pane, and when it leaves the respective recesses, the coupling element can cause a pushing force that tilts the offset free end of the pull rod away from the pane.

In a further advantageous embodiment of the pane arrangement, the offset free end of the pull rod can move the at least one seal in the direction of the pane when the movable coupling element enters one of the recesses and press against a corresponding uncoated region of the pane in a sealing manner with a predeterminable force. In addition, the offset free end of the pull rod can lift the at least one seal off the pane when extending the movable coupling element out of the respective recess.

In a further advantageous embodiment of the pane arrangement, the coupling element may be coupled to the drive of the pane in such a way that the coupling element in the closed position of the pane is positioned in the first end position and in a first recess of the guide track, and in the open position of the pane is positioned in the second end position and in a second recess of the guide track.

The advantages and preferred embodiments described for the pane arrangement according to embodiments of the invention also apply to the vehicle according to the invention.

The features and feature combinations mentioned above in the description, as well as the features and feature combinations mentioned below in the description of the drawing and/or mentioned only in the figures, can be used in the specified combination but also in other combinations or alone without having to go beyond the scope of the invention. Thus, embodiments of the invention that are not explicitly shown or explained in the figures, but are contained in the described embodiments and producible by means of separated feature combinations are to be regarded as included and disclosed.

BRIEF DESCRIPTION OF THE FIGURES

Exemplary embodiments of the invention are depicted in the drawings and are explained in more detail in the following description. In the drawings, identical reference signs denote components or elements which perform identical or analogous functions. In the drawings.

DETAILED DESCRIPTION OF THE FIGURES

Figure 1:
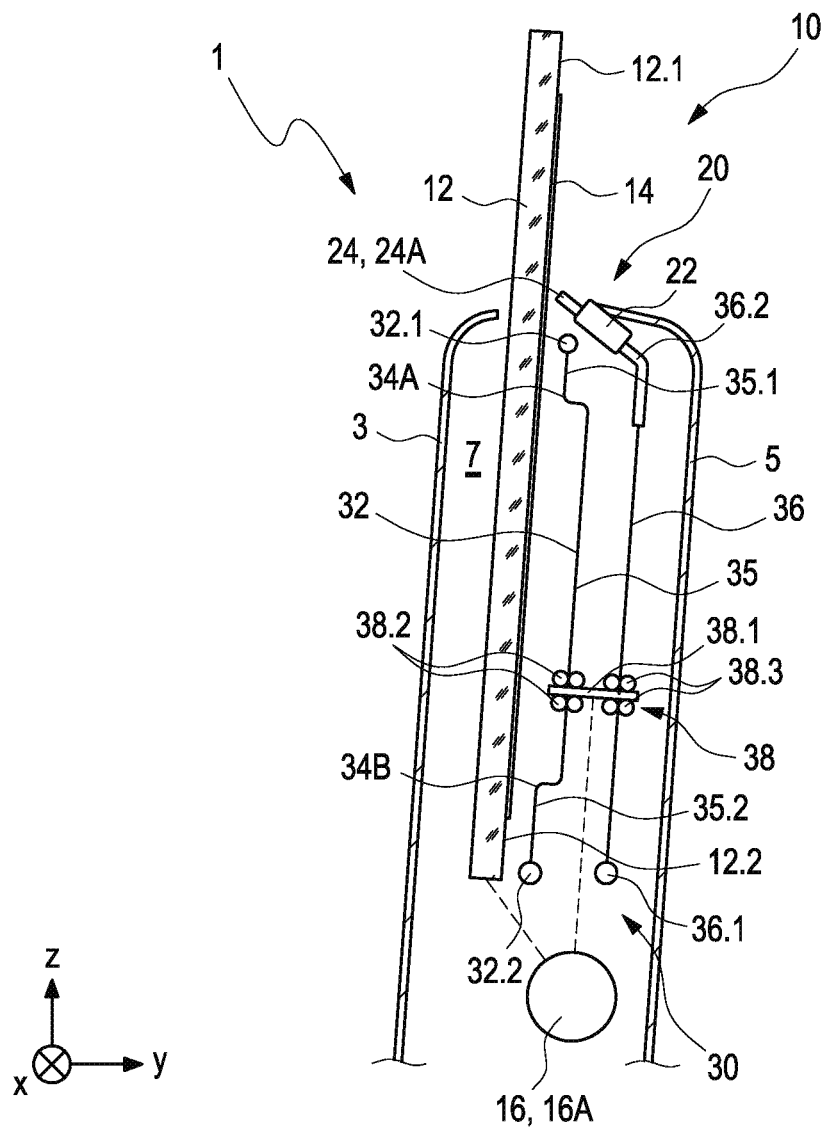
FIG. 1 is a schematic and partial sectional view of a vehicle according to an embodiment of the invention in the region of a vehicle door with a pane assembly according to an embodiment of the invention.

As can be seen from FIG. 1, the depicted detail of a vehicle according to an embodiment of the invention shows a vehicle door 1 of a pane arrangement 10 according to an embodiment of the invention. Here, the pane arrangement 10 is arranged in a receiving shaft 7 of the vehicle door 1, which is delimited by an outer panel 3 and an inner panel 5 of the vehicle door 1. As can further be seen from FIG. 1, the depicted pane arrangement 10 seals the inner panel 5 of the vehicle door 1 against the pane 12 at the upper end of the receiving shaft 7.

Figure 2:
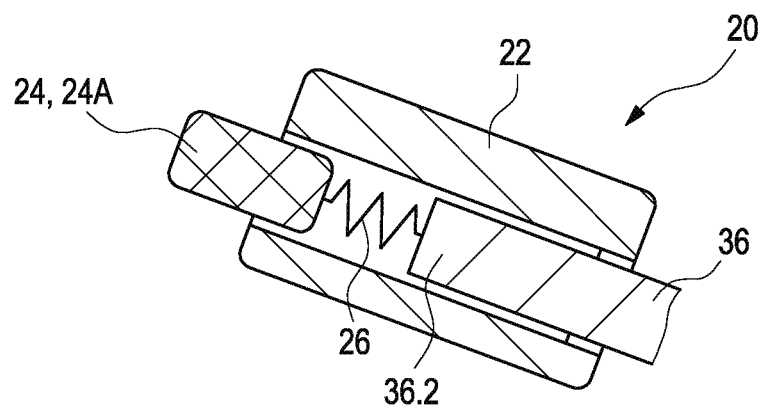
FIG. 2 is a schematic sectional view of a sealing arrangement of the pane arrangement according to an embodiment of the invention from FIG. 1.

As can further be seen from FIGS. 1 and 2, the illustrated pane arrangement 10 according to an embodiment of the invention comprises a movable pane 12 which has a disinfecting inner coating 14, a drive 16 which moves the pane 12 between an open position and a closed position, and a sealing arrangement 20 which comprises at least one seal 24 for sealing the pane 12. Here, a coupling device 30 couples the at least one seal 24 in the open position and in the closed position sealingly with an uncoated region 12.1, 12.2 of the pane 12. During a movement of the pane 12 and in positions of the pane 12 between the open position and the closed position, the coupling device 30 lifts the at least one seal 24 off the pane 12.

As can further be seen from FIG. 1, in the exemplary embodiment of the pane arrangement 10 shown, the coupling device 30 comprises a stationary lifting guide 32, which is aligned in the receiving shaft 7 of the vehicle door 1 parallel to the direction of movement of the pane 12, and a movably mounted pull rod 36, which in the unloaded state is oriented parallel to the lifting guide and is coupled to the lifting guide 32 via a movable coupling element 38. The lifting guide 32 is screwed to the vehicle door 1 at an upper fastening point 32.1 and at a lower fastening point 32.2. Of course, other suitable fastening techniques can also be used to secure the lifting guide 32.

As can further be seen from FIG. 1, in the exemplary embodiment of the pane arrangement 10 shown, the pull rod 36 is mounted on the vehicle door in a rotatably movable manner at one end at a fastening point 36.1 and has an offset free end 36.2 which is coupled to the at least one seal 24. The stationary lifting guide 32 forms a guide track 35 for the movable coupling element 38, which guide track has a recess 35.1, 35.2 in the direction of the pane 12 at a first end position 34A and at a second end position 34B for the movable coupling element 38. During immersion in one of the recesses 35.1, 35.2, the coupling element 38 moves the offset free end 36.2 of the pull rod 36 in the direction of the pane 12. When extending out of the respective recesses 35.1, 35.2, the coupling element 38 moves the offset free end 36.2 of the pull rod 36 away from the pane 12. By means of the lifting guide 32 and the coupling element 38, a tilting position of the rotatably mounted pull rod 36 and thus also the position of the at least one seal 24 is set. As a result of the rotatably movable mounting of the pull rod 36 at the fastening point 36.1, when the movable coupling element 38 is immersed in one of the recesses 35.1, 35.2, a pulling force acts on the pull rod 36, which tilts the offset free end 36.2 of the pull rod 36 in the direction of the pane 12, so that the free end 36.2 of the pull rod 36 presses the at least one seal 24 in a sealing manner against a corresponding uncoated region 12.1, 12.2 of the pane 12 with a predeterminable force. As can further be seen from FIG. 1, a first uncoated region 12.1 of the pane 12 is formed on an upper edge of the pane 12. A second uncoated region 12.2 is formed on a lower edge of the pane 12. When extending the movable coupling element 38 out of the corresponding recess 35.1, 35.2, a pushing force acts on the pull rod 36, which tilts the offset free end 36.2 of the pull rod 36 away from the pane 12, so that the offset free end 36.2 of the pull rod 36 lifts the at least one seal 24 from the pane 12.

As can further be seen from FIG. 1, the coupling element 38 is coupled to the drive 16 of the pane 12 via an operative connection shown in dashed lines such that the coupling element 38 in the closed position of the pane 12 is positioned in the first end position 34A and in a first recess 35.1 of the guide track 35. In the open position of the pane 12, the coupling element 38 is positioned in the second end position 34B and in a second recess 35.2 of the guide track 35. Between the closed position and the open position of the pane 12, the drive 16 moves the pane 12 vertically downward in the negative z-direction, wherein the coupling element 38 is displaced starting from the first end position 34A from the first recess 35.1 in the negative z-direction in the direction of the second recess 35.2. Between the open position and the closed position of the pane 12, the drive 16 moves the pane 12 vertically upward in the positive z-direction, wherein the coupling element 38 is displaced starting from the second end position 34B from the second recess 35.2 in the positive z-direction in the direction of the first recess 35.1. In the exemplary embodiment shown, the coupling element 38 comprises a coupling rod 38.1 at each end of which a plurality of guide rollers 38.2, 38.3 are arranged. Here, first guide rollers 38.2 are coupled to the lifting guide 32 at a first end of the coupling rod 38.1 and roll thereon. Second guide rollers 38.3 at a second end of the coupling rod 38.1 are coupled to the pull rod 36 and roll thereon. In the exemplary embodiment shown, two first guide rollers 38.2 are arranged on both sides of the lifting guide 32 and two second guide rollers 38.3 are arranged on both sides of the pull rod 36. In addition, the coupling rod 38.1 is coupled to the drive 16.

As can further be seen from FIG. 2, the free end 36.2 of the pull rod 36 is coupled to the at least one seal 24 via a spring element 26 in the exemplary embodiment shown. In this case, the at least one seal 24, which in the depicted exemplary embodiment is designed as a sealing rubber 24A, the spring element 26 and the free end 36.2 of the pull rod 36 are accommodated at least partially by a seal receptacle 22, which in the depicted exemplary embodiment is designed as a sleeve. A wall of the seal receptacle 22 guides the seal 24 and the free end 36.2 of the pull rod 36 during movement in the direction of the pane 12 and during the movement away from the pane 12.

REFERENCE NUMBERS

1 Vehicle door
3 Outer panel
5 Inner panel
7 Receiving shaft
10 Pane arrangement
12 Movable pane
12.1, 12.2 Uncoated region
14 Disinfecting inner coating
16 Drive
16A Electric motor
20 Sealing arrangement
22 Seal receptacle
24 Seal
24A Sealing rubber
26 Spring element
30 Coupling device
32 Lifting guide
32.1, 32.2 Fastening point
34A, 34B End position
35 Guide track
35.1, 35.2 Recess
36 Pull rod
36.1 Fastening point
36.2 Free end
38 Coupling element
38.1 Coupling rod
38.2, 38.3 Guide roller
x Longitudinal direction
y Transverse direction
z Vertical direction

The invention claimed is:

1. A pane arrangement for a vehicle door, comprising:
a movable pane comprising a disinfecting coating disposed on an interior surface of the movable pane;
a drive configured to move the pane between an open position and a closed position;
a sealing arrangement comprising a seal configured to seal the pane against a panel of the vehicle door; and
a coupling device configured to sealingly couple the seal against an uncoated region of the pane when the pane is set in the open position and in the closed position, and to lift the seal off the pane when the pane is moving between the open position and the closed position, wherein the coupling device comprises:
a stationary lifting guide extending parallel to a direction of movement of the pane; and
a movably mounted pull rod coupled to the lifting guide via a movable coupling element, the pull rod extending parallel to the lifting guide when set in an unloaded state.

2. The pane arrangement according to claim 1, wherein the pull rod comprises a first end rotatably mounted at a fastening point in the vehicle door and a second end coupled to the seal, the second end of the pull rod being offset from the first end of the pull rod and being free from coupling to the vehicle door.

3. The pane arrangement according to claim 2, wherein the second end of the pull rod is coupled to the seal via a spring element.

4. The pane arrangement according to claim 2, wherein the stationary lifting guide defines a guide track for the movable coupling element, the guide track comprising:
a first recess extending toward the pane at a first end position of the stationary lifting guide; and
a second recess extending toward the pane at a second end position of the stationary lifting guide,
wherein the movable coupling element is configured to move along the guide track and be received in the first and second recesses of the guide track.

5. The pane arrangement according to claim 4,
wherein the coupling element is configured to tilt the second end of the pull rod in a direction toward the pane when the coupling element is received into the first recess and into the second recess, and
wherein the coupling element is configured to tilt the second end of the pull rod in a direction away from the pane when the coupling element is moved out of the first recess and out of the second recess.

6. The pane arrangement according to claim 5, wherein the second end of the pull rod is configured to press the seal in a sealing manner against the uncoated region of the pane when the movable coupling element is received into one of the first and second recesses and tilts the second end of the pull rod in the direction toward the pane.

7. The pane arrangement according to claim 5, wherein the second end of the pull rod is configured to lift the seal off the pane when the movable coupling element is moved out of one of the first and second recesses.

8. The pane arrangement according to claim 4, wherein the coupling element is coupled to the drive such that the coupling element is configured to be received in the first recess of the guide track at the first end position of the stationary lifting guide when the pane is set in the closed position, and received in the second recess of the guide track at the second end position of the stationary lifting guide when the pane is set in the open position.

9. A vehicle comprising:
a vehicle door having a receiving shaft; and
a pane arrangement disposed in the receiving shaft of a vehicle door, the pane arrangement comprising:
a movable pane comprising a disinfecting coating disposed on an interior surface of the movable pane,
a drive configured to move the pane between an open position and a closed position,
a sealing arrangement comprising a seal configured to seal the pane against a panel of the vehicle door, and
a coupling device configured to sealingly couple the seal against an uncoated region of the pane when the pane is set in the open position and in the closed position, and lift the seal off the pane when the pane is moving between the open position and the closed position, wherein the coupling device comprises:

a movably mounted pull rod extending parallel to a direction of movement of the pane when set in an unloaded state, wherein the pull rod comprises a first end rotatably mounted at a fastening point in the vehicle door and a second end coupled to the seal, wherein the second end of the pull rod is free from coupling to the vehicle door and titled in a direction toward the pane such that the second end of the pull rod is offset from the first end of the pull rod.

10. The vehicle according to claim 9, wherein the coupling device comprises:

a stationary lifting guide extending parallel to the direction of movement of the pane, wherein the pull rod is coupled to the lifting guide via a movable coupling element.

11. The vehicle according to claim 10, wherein the stationary lifting guide defines a guide track for the movable coupling element, the guide track comprising:

a first recess extending toward the pane at a first end position of the stationary lifting guide; and a second recess extending toward the pane at a second end position of the stationary lifting guide, wherein the movable coupling element is configured to move along the guide track and be received in the first and second recesses of the guide track.

12. The vehicle according to claim 11, wherein the coupling element is configured to tilt the second end of the pull rod in the direction toward the pane when the coupling element is received into the first recess and into the second recess, and wherein the coupling element is configured to tilt the second end of the pull rod in a direction away from the pane when the coupling element is moved out of the first recess and out of the second recess.

13. The vehicle according to claim 12, wherein the second end of the pull rod is configured to press the seal in a sealing manner against the uncoated region of the pane when the movable coupling element is received into one of the first and second recesses and tilts the second end of the pull rod in the direction toward the pane.

14. The vehicle according to claim 11, wherein the second end of the pull rod is configured to lift the seal off the pane when the movable coupling element is moved out of one of the first and second recesses.

15. The vehicle according to claim 11, wherein the coupling element is coupled to the drive such that the coupling element is configured to be received in the first recess of the guide track at the first end position of the stationary lifting guide when the pane is set in the closed position, and received in the second recess of the guide track at the second end position of the stationary lifting guide when the pane is set in the open position.

16. The vehicle according to claim 9, wherein the second end of the pull rod is coupled to the seal via a spring element.

* * * * *